United States Patent
Nishigaki

(10) Patent No.: US 7,623,395 B2
(45) Date of Patent: Nov. 24, 2009

(54) BUFFER CIRCUIT AND BUFFER CONTROL METHOD

(75) Inventor: Yasuhiro Nishigaki, Tokyo (JP)

(73) Assignee: NEC Corporation, Tokyo (JP)

( * ) Notice: Subject to any disclaimer, the term of this patent is extended or adjusted under 35 U.S.C. 154(b) by 238 days.

(21) Appl. No.: 11/729,824

(22) Filed: Mar. 30, 2007

(65) Prior Publication Data

US 2007/0230259 A1 Oct. 4, 2007

(30) Foreign Application Priority Data

Mar. 31, 2006 (JP) ............................. 2006-097595

(51) Int. Cl.
*G11C 7/00* (2006.01)
(52) U.S. Cl. .............................. 365/189.12; 365/230.06
(58) Field of Classification Search ............ 365/189.12, 365/230.06
See application file for complete search history.

(56) References Cited

U.S. PATENT DOCUMENTS

| 4,258,418 A | * | 3/1981 | Heath ........................... 710/53 |
| 5,426,639 A | * | 6/1995 | Follett et al. ................. 370/412 |
| 2005/0060453 A1 | * | 3/2005 | Matsui et al. ............... 710/107 |

FOREIGN PATENT DOCUMENTS

JP 2003-36145 2/2003

\* cited by examiner

*Primary Examiner*—Michael T Tran
(74) *Attorney, Agent, or Firm*—McGinn IP Law Group, PLLC

(57) ABSTRACT

A buffer circuit includes a storage unit having a first storage capacity that stores data based on a write request inputted from an outside and outputs the data in an order in which the data was written, based on a read request inputted from the outside. And a second storage capacity in the first storage capacity which is used to store the data is adjusted based on an amount of valid data which has been written into the storage unit but has not been read from the storage unit.

15 Claims, 17 Drawing Sheets

BUFFER CIRCUIT AND BUFFER CONTROL METHOD

BACKGROUND OF THE INVENTION

1. Field of the Invention

The present invention relates to a buffer circuit and a buffer control method, and more particularly, to a buffer circuit capable of dynamically adjusting a buffer capacity based on a valid data amount to suitably reduce power consumption and a buffer control method of controlling the buffer circuit.

2. Description of the Related Art

Data transfer is generally performed between an input-output (I/O) device such as a hard disk and a memory through a buffer circuit. FIG. 13 shows a structural example of a conventional first-in first-out (FIFO) buffer circuit. As shown in FIG. 13, the FIFO buffer circuit includes a write control unit (WCU) 5, a read control unit (RCU) 6, and a data storage unit (DSU) 7.

A write enable signal (WE) 501 is a write enable signal from the outside. Write data (WD) 502 is write data from the outside. A read enable signal (RE) 601 is a read enable signal from the outside. Read data (RD) 602 is read data to the outside. A clock (clk) 100 is a synchronizing clock signal and used for timing control in each of the WCU 5, the RCU 6, and the DSU 7.

The WCU 5 includes a write pointer generator (WPG) 51 for generating a write pointer (wp) 56 based on the WE 501. The WCU 5 generates write data (wd) 57 based on the WD 502 and generates a write enable signal (we) 58 based on the WD 502. When the we 58 is 1, the WCU 5 writes the wd 57 into the DSU 7 at an address indicated by the wp 56.

The RCU 6 includes a read pointer generator (RPG) 61 for generating a read pointer (rp) 66 based on the RE 601. The RCU 6 reads read data (rd) 67 from the DSU 7 at an address indicated by the rp 66. When the RE 601 is 1, the RCU 6 generates the rd 67 as the RD 602.

The DSU 7 includes a buffer whose capacity is N words. The buffer has two buffer units, BU-A 71 and BU-B 72, each of whose capacity is N/2 words.

Hereinafter, the structures of the WCU 5, the RCU 6, and the DSU 7 will be described in detail with reference to the attached drawings.

The WCU 5 will be described in detail with reference to FIG. 14. The WCU 5 includes the WPG 51, a write data generator (WDG) 52, and a write enable generator (WEG) 53.

The WDG 52 synchronizes the WD 502 with the clk 100 and generates the wd 57. The WEG 53 synchronizes the WE 501 with the clk 100 and generates the we 58.

The WPG 51 includes a write pointer resister (WPR) 54 for holding the wp 56. A value held by the WPR 54 is added with 1 by an adder 55 at a timing of the next clock of the clock at which data is written. The WPR 54 generates addresses covering the entire area (N words) of the DSU 7. The WPG 51 can be realized using an N-bit ring counter (a scale-of-N counter).

In the DSU 7 located at a subsequent stage of the WCU 5, when the we 58 is 1, a value of the wd 57 is written into the DSU 7 at an address specified by the wp 56.

The RCU 6 will be described in detail with reference to FIG. 15. The RCU 6 includes the RPG 61, a read data generator (RDG) 62, and a read enable generator (REG) 63.

The REG 63 synchronizes the RE 601 with the clk 100 and generates a read enable signal (re) 68. The RDG 62 obtains the rd 67 from the DSU 7 in response to the re 68 and generates the RD 602.

The RPG 61 includes a read pointer register (RPR) 64 for holding the rp 66. A value held by the RPR 64 is added with 1 by an adder 65 at a timing of the next clock of the clock at which data is read. The RPR 64 generates addresses covering the entire area (N words) of the DSU 7. The RPG 61 can be realized using an N-bit ring counter.

The RCU 6 obtains the rd 67 from the DSU 7 an address specified by the rp 66, at a timing when the re 68 is 1. That is, the timing when the re 68 is 1 is an effective timing of the rd 67.

The DSU 7 will be described in detail with reference to FIG. 16. The buffer of the DSU 7 has the two buffer units (BU-A 71 and BU-B 72).

The DSU 7 generates a write enable signal (we-A) 73 to the BU-A 71 and a write enable signal (we-B) 74 to the BU-B 72 based on the we 58 and the wp 56. At this time, in order to select the BU-A 71 or the BU-B 72 as a destination of the wd 57, the wp 56 is divided into a write pointer (wp-MSB) 76 which is a most significant bit (MSB) and a write pointer (wp') 75 including other bits. When the wp-MSB 76 is 0, the destination is the BU-A 71. When the wp-MSB 76 is 1, the destination is the BU-B 72.

That is, when the wp-MSB 76 is 0, the we-A 73 becomes 1. At this time, the wd 57 is written into the BU-A 71 at an address indicated by the wp' 75 at a timing determined by the clk 100. When the wp-MSB 76 is 1, the we-B 74 becomes 1. At this time, the wd 57 is written into BU-B 72 at an address indicated by the wp' 75 at a timing determined by the clk 100.

The DSU 7 generates read addresses for the BU-A 71 and the BU-B 72 based on the rp 66. At this time, in order to select read data (rd-A) 77 from the BU-A 71 or read data (rd-B) 78 from the BU-B 72, the rp 66 is divided into a read pointer (rp-MSB) 701 which is an MSB and a read pointer (rp') 702 including other bits. When the rp-MSB 701 is 0, the rd-A 77 is selected by a selector 79. When the rp-MSB 701 is 1, the rd-B 78 is selected by the selector 79. The selected read data is outputted as the rd 67.

Hereinafter, the operation of the conventional FIFO buffer circuit having the above-mentioned structure will be described with reference to a timing diagram shown in FIG. 17. In order to facilitate understanding, a case where a buffer capacity N is set to 16 words, each of the wp 56 and the rp 66 has four bits to specify addresses 0 to 15 will be described as an example.

As shown in FIG. 17, when the WE 501 becomes 1 at a timing 0 (t0), the we 58 is changed to 1 at a timing 1 (t1). At this time, the wp 56 is 0, so the wp-MSB 76 is 0. Therefore, the we-A 73 becomes 1, so the wd 57 is written into BU-A 71 at an address 0. The wp 56 is added with 1 at a timing 2 (t2).

After that, the WE 501 is 0 for a period-between a timing 2 (t2) and a timing 8 (t8). Therefore, the we-A 73 is 1 for a period between a timing 3 (t3) and a timing 9 (t9), with the result that the wd 57 is written into BU-A 71 at each address specified by the wp' 75 which is 0 to 7.

When the RE 601 becomes 1 at the timing 1 (t1), the re 68 is changed to 1 at the timing 2 (t2). At this time, the rp 66 is 0. Therefore, the rd-A 77 is read from the BU-A 71 at the address 0 and the rd-B 78 is read from the BU-B 72 at an address 0. The rp-MSB 701 is 0, so the rd-A 77 is outputted as the RD 602. The rp 66 is added with 1 at the timing 3 (t3).

After that, the RE 601 is 1 for periods related to timings, t3, t5, t6, and t8 to t15, so the re 68 is 1 for periods related to timings t4, t6, t7, and t9 to t16. Therefore, the rd-A 77 is selected from BU-A 71 at each address specified by the rp' 702 which is 1 to 7 and outputted as the RD 602.

When the WE 501 becomes 1 at the timing 10 (t10), the we 58 is changed to 1 at the timing 11 (t11). At this time, the wp 56 is 8, so the wp-MSB 76 is 1. Therefore, the wd 57 is written into BU-B 72 at the address 0. Then, the rp 66 becomes 8 at the timing 13 (t13), so the rp-MSB) 701 is 1. Therefore, the rd-B 78 is selected from the address 0 of the BU-B 72 and outputted as the RD 602.

When the wp 56 returns to 0 at a timing 20 (t20), the wd 57 is written into BU-A 71 at the address 0. When the rp 66 returns to 0 at a timing 23 (t23), the rd-A 77 is selected from the address 0 of the BU-A 71 and outputted as the RD 602.

A technique related to a data transfer control apparatus using the above-mentioned FIFO buffer (FIFO memory) circuit is disclosed in Japanese Patent Application Laid-open No. 2003-36145.

The FIFO buffer circuit is constructed using a scale-of-N counter to be a ring buffer. Therefore, the conventional FIFO buffer circuit has the following problems to be pointed out.

The FIFO buffer circuit is controlled simply using the ring counter whose maximum buffer capacity is N. The buffer capacity N is fixed and the capacity cannot be dynamically adjusted.

Therefore, the FIFO buffer circuit has a problem that all of the area of the FIFO buffer is always operating to consume power, though all of the area is not always filled with data.

The control based on a remaining amount of "valid data", which is remaining data in a buffer area that has been written but has not been read yet, is essentially ideal. However, such control cannot be performed on the conventional FIFO buffer circuit.

SUMMARY OF THE INVENTION

The present invention was made to solve the foregoing and other exemplary problems, drawbacks, and disadvantages of the conventional structures.

In view of the problems, drawbacks, and disadvantages, an exemplary feature of the present invention is to provide a buffer circuit whose buffer capacity is dynamically adjusted based on a valid data amount, and a buffer control method of controlling the buffer circuit.

In an exemplary embodiment of the present invention to attain the above and other exemplary purposes, a buffer circuit includes a storage unit having a first storage capacity that stores data based on a write request inputted from an outside and outputs the data in a order in which the data was written, based on a read request inputted from the outside, and a second storage capacity in the first storage capacity which is used to store the data is adjusted based on an amount of valid data which has been written into the storage unit but has not been read from the storage unit.

According to the present invention, the buffer capacity is dynamically adjusted based on the valid data amount. A buffer area other than a buffer area in which valid data is stored can be set to a disable state. Therefore, in the present invention, there is an advantage that power consumption can be suitably reduced.

BRIEF DESCRIPTION OF THE DRAWINGS

The above exemplary purpose, feature and advantage of the present invention will become more apparent from the following detailed description when taken in conjunction with the accompanying drawings wherein.

DESCRIPTION OF THE EXEMPLARY EMBODIMENTS

1. First Exemplary Embodiment

A buffer circuit according to a first exemplary embodiment of the present invention will be described with reference to the attached drawings.

Figure 1:
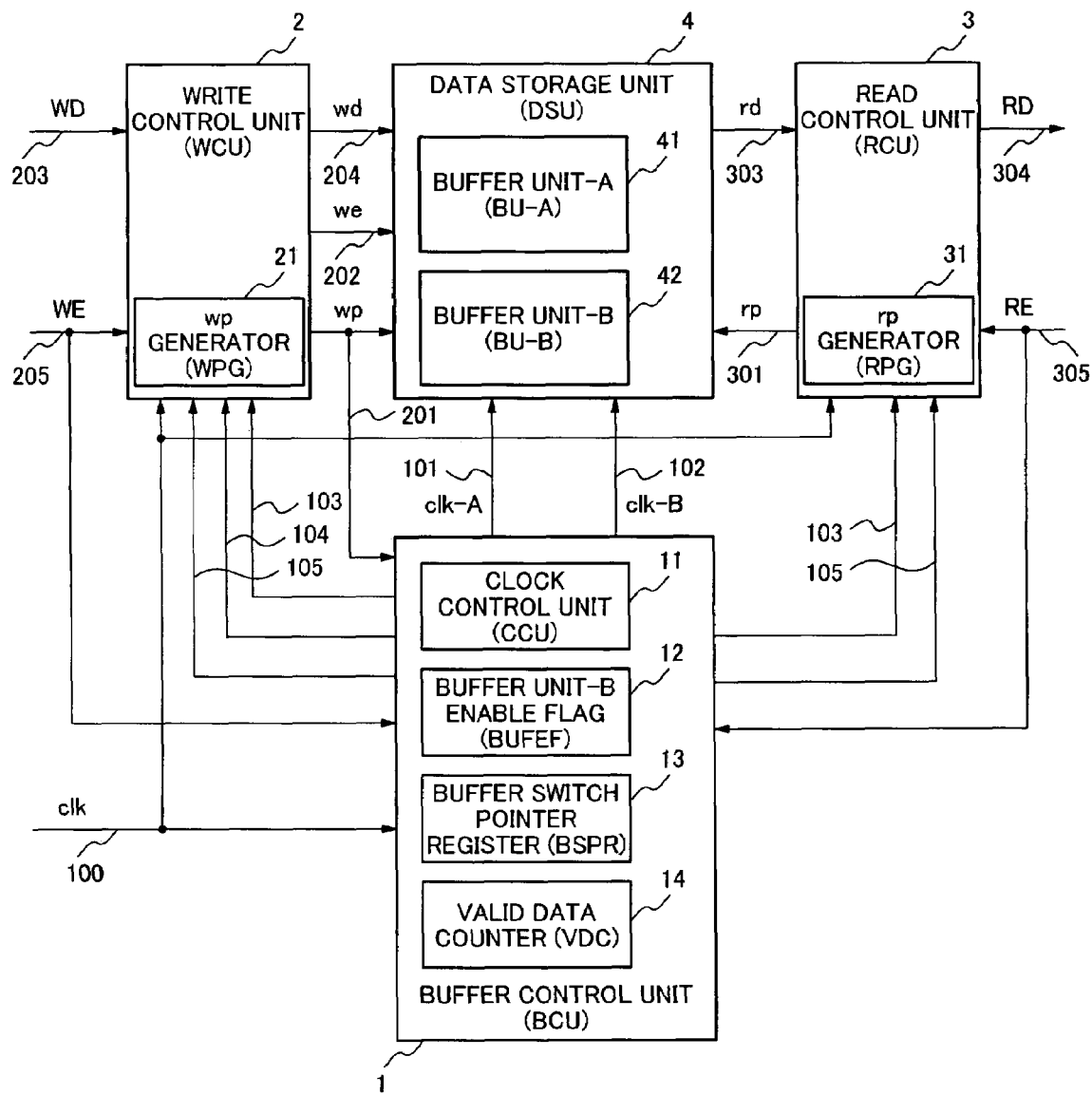
FIG. 1 is a block diagram showing a structural example of a buffer circuit according to a first exemplary embodiment of the present invention.

FIG. 1 is a block diagram showing a structural example of a FIFO buffer circuit according to the first exemplary embodiment. As shown in FIG. 1, the FIFO buffer circuit includes a buffer control unit (BCU) 1, a write control unit (WCU) 2, a read control unit (RCU) 3, and a data storage unit (DSU) 4.

The BCU 1 includes a clock control unit (CCU) 11, a buffer unit-B enable flag (BUBEF) 12, a buffer switching pointer resistor (BSPR) 13, and a valid data counter (VDC) 14. The BCU 1 generates a signal for controlling a write operation of the WCU 2 and a signal for controlling a read operation of the RCU 3, and supplies respective clocks, clk-A 101 and clk-B 102, to two buffer units, BU-A 41 and BU-B 42, of the DSU 4.

The WCU 2 includes a write pointer (wp) generator (WPG) 21 and controls a write operation of data to the DSU 4.

The RCU 3 includes a read pointer (rp) generator (RPG) 31 and controls a read operation of data from the DSU 4.

The DSU 4 is a buffer whose maximum buffer amount is N words. The DSU 4 includes two buffer units, each of whose capacity is N/2 words, that is, the BU-A 41 and the BU-B 42.

A synchronizing clock (clk) 100 is supplied from the outside to each of the BCU 1, the WCU 2, and the RCU 3.

Hereinafter, respective structures of the above-mentioned units will be described in detail with reference to the attached drawings.

Figure 2:
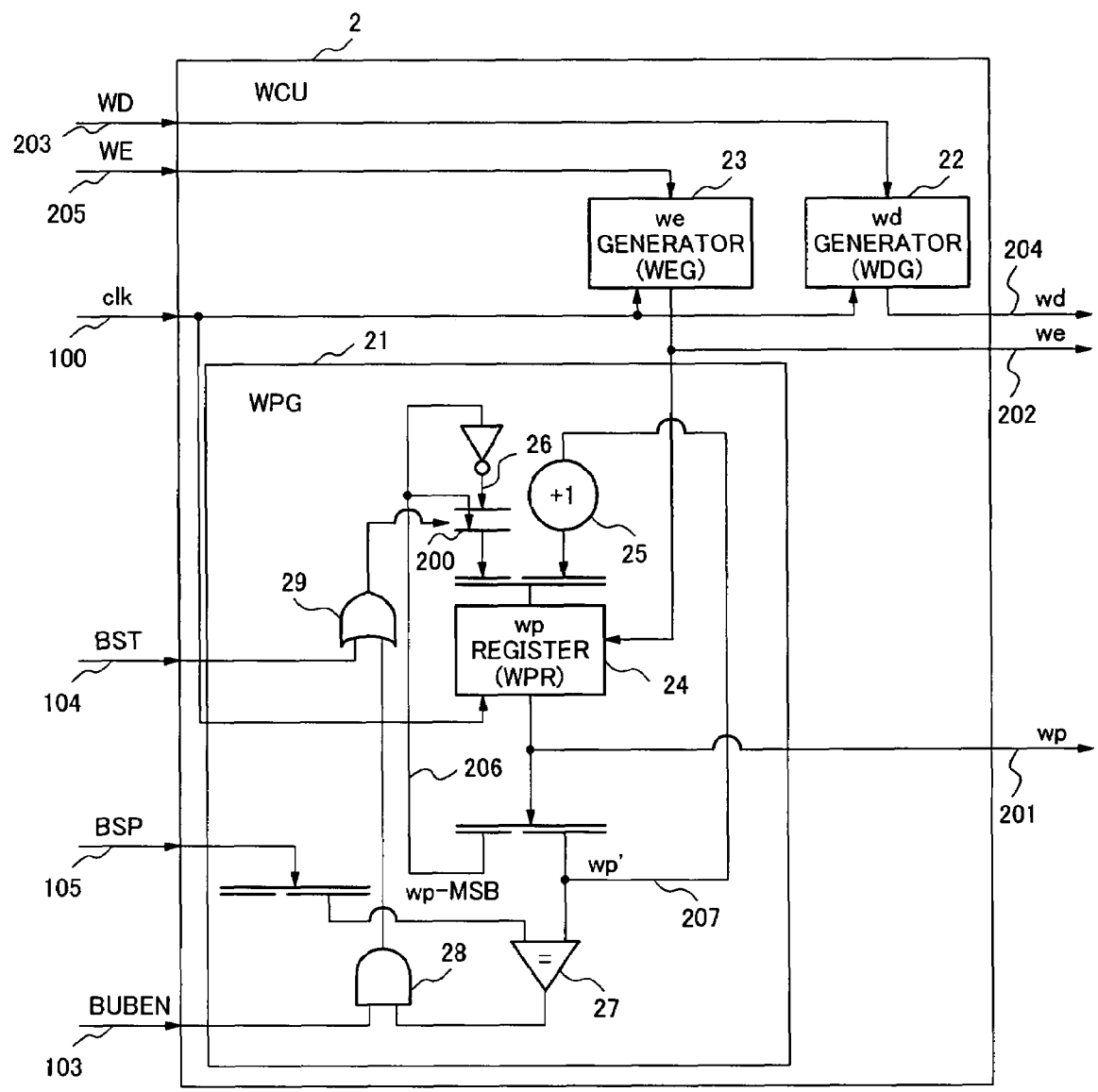
FIG. 2 is a block diagram showing a structural example of a write control unit in the first exemplary embodiment of the present invention.

First, the WCU 2 will be described in detail with reference to FIG. 2. The WCU 2 includes the WPG 21, a write data generator (WDG) 22, and a write enable generator (WEG) 23.

The WPG 21 includes a write pointer register (WPR) 24 for outputting a write pointer (wp) 201 indicating a destination address to the DSU 4. When a write enable signal (we) 202 is 1, a value which is held by the WPR 24 and includes bits other than a most significant bit (MSB) is added with 1 by an adder 25 at a timing of the next clock of a clock at which data is written.

The WDG 22 synchronizes write data (WD) 203 which is write data from the outside with the clk 100 and generates write data (wd) 204. The WEG 23 synchronizes a write enable signal (WE) 205 with the clk 100 and generates the we 202.

When the we 202 is 1, in the DSU 4 located at a subsequent stage of the WCU 2, a value of the wd 204 is written into the BU-A 41 or the BU-B 42 at an address specified by the wp 201.

The MSB of the wp 201 is a bit indicating whether the wd 204 is write data for the BU-A 41 or the BU-B 42. Specifically, when the MSB is 0, the bit indicates that the wd 204 is write data for the BU-A 41. When the MSB is 1, the bit indicates that the wd 204-is write data for the BU-B 42.

When the we 202 is 1, the DSU 4 performs a write control so that a value of the wd 204 is written into one of the BU-A 41 and the BU-B 42 according to the address specified by the wp 201.

A mechanism for dynamically adjusting a buffer capacity based on a valid data amount, which is the feature of the present invention, is realized by an operation based on a write pointer (wp-MSB) 206 which is the MSB of the wp 201. With the operation, the BU-B 42 is not used when the valid data amount is small. Here, "valid data" means data which has been written but has not been read yet, as described above.

Specifically, the dynamic buffer capacity control based on the valid data amount is realized by controlling the wp-MSB 206 based on an output of an OR gate (OR) 29. That is, any one of the wp-MSB 206 and an inverted output 26 of the wp-MSB 206 is selected by a selector 200 based on the output of the OR 29 to change the MSB of the WPR 24. The selector 200 selects the wp-MSB 206 when the output of the OR 29 is 0 and selects the inverted output 26 of the wp-MSB 206 when the output of the OR 29 is 1.

There are two conditions for changing the wp-MSB 206. A first condition is a combination of a case where a write pointer (wp') 207 is equal to a value of a buffer unit-B switch-pointer (BSP) 105 (described in detail later) other than MSB thereof, and a case where a buffer unit-B enable signal (BUBEN) 103 (described in detail later) is 1. The wp' 207 is a write pointer composed by the bits of the wp 201 other than wp-MSB 206. When wp' 207 is equal to BSP 105 other than the MSB, the output of a comparator 27 becomes 1. In such a case, an output of an AND gate (AND) 28 becomes 1. A second condition is a case where a buffer unit-B enable set timing signal (BST) 104 (described in detail later) is 1.

When any of the first condition and the second condition is satisfied, the output of the OR 29 becomes 1. When both conditions are not satisfied, the output of the OR 29 becomes 0.

Figure 3:
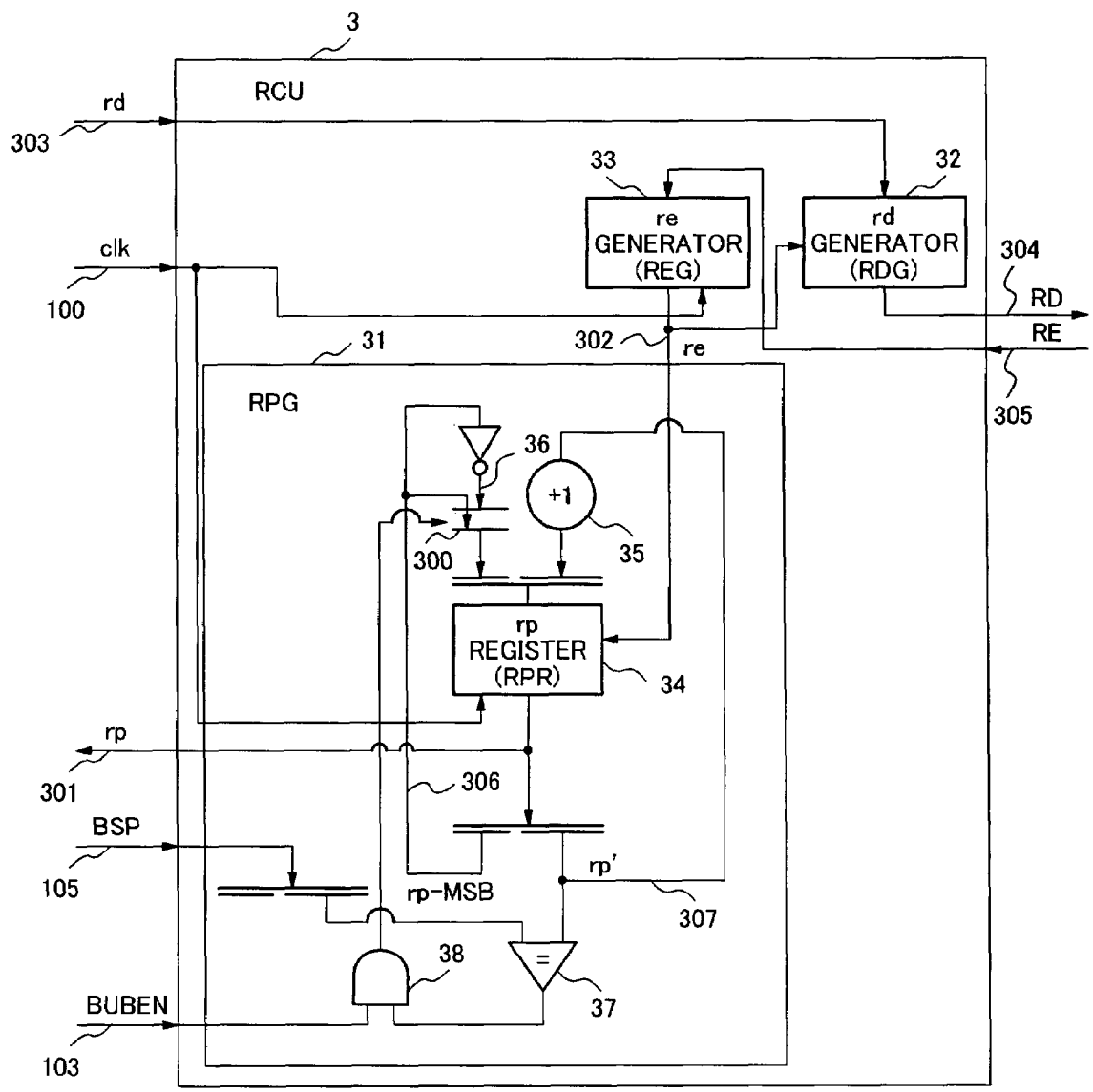
FIG. 3 is a block diagram showing a structural example of a read control unit in the first exemplary embodiment of the present invention.

Next, the RCU 3 will be described in detail with reference to FIG. 3. The RCU 3 includes the RPG 31, a read data generator (RDG) 32, and a read enable generator (REG) 33.

The RPG 31 includes a read pointer register (RPR) 34 for outputting a read pointer (rp) 301 indicating a source address to the DSU 4. When a read enable signal (re) 302 is 1, a value which is held by the RPR 34 and includes bits other than the MSB is added with 1 by an adder 35 at a timing of the next clock of a clock at which data is read.

The RDG 32 synchronizes read data (rd) 303 which is read data from the DSU 4 with the clk 100 and generates write data (RD) 304. The REG 33 synchronizes a read enable signal (RE) 305 with the clk 100 and generates the re 302.

When the re 302 is 1, the RCU 3 holds the rd 303 which is read data from the DSU 4. That is, the timing when the re 302 is 1 is an effective timing of the rd 303.

As in the case of the WCU 2, the RCU 3 performs an operation based on a read pointer (rp-MSB) 306 which is the MSB of the rp 301. With the operation, the BU-B 42 is not used when the valid data amount is small, and the buffer capacity is changed dynamically. Specifically, the rp-MSB 306 is controlled based on an output of an AND gate (AND) 38. That is, any one of the rp-MSB 306 and an inverted output 36 of the rp-MSB 306 is selected by a selector 300 based on the output of the AND 38 to change the MSB of the RPR 34. The selector 300 selects the rp-MSB 306 when the output of the AND 38 is 0 and selects the inverted output 36 of the rp-MSB 306 when the output of the AND 38 is 1.

A condition for changing the rp-MSB 306 is a combination of a case where a value (rp') 307 is equal to a value of the BSP 105 (described in detail later) other than MSB thereof, and a case where BUBEN 103 (described in detail later) is 1. The rp' 307 is a read pointer composed by the bits of the rp 301 other than rp-MSB 306. When the rp' 307 is equal to BSP 105 other than the MSB, the output of a comparator 37 is 1. In such a case, the output of the AND 38 is 1.

Figure 4:
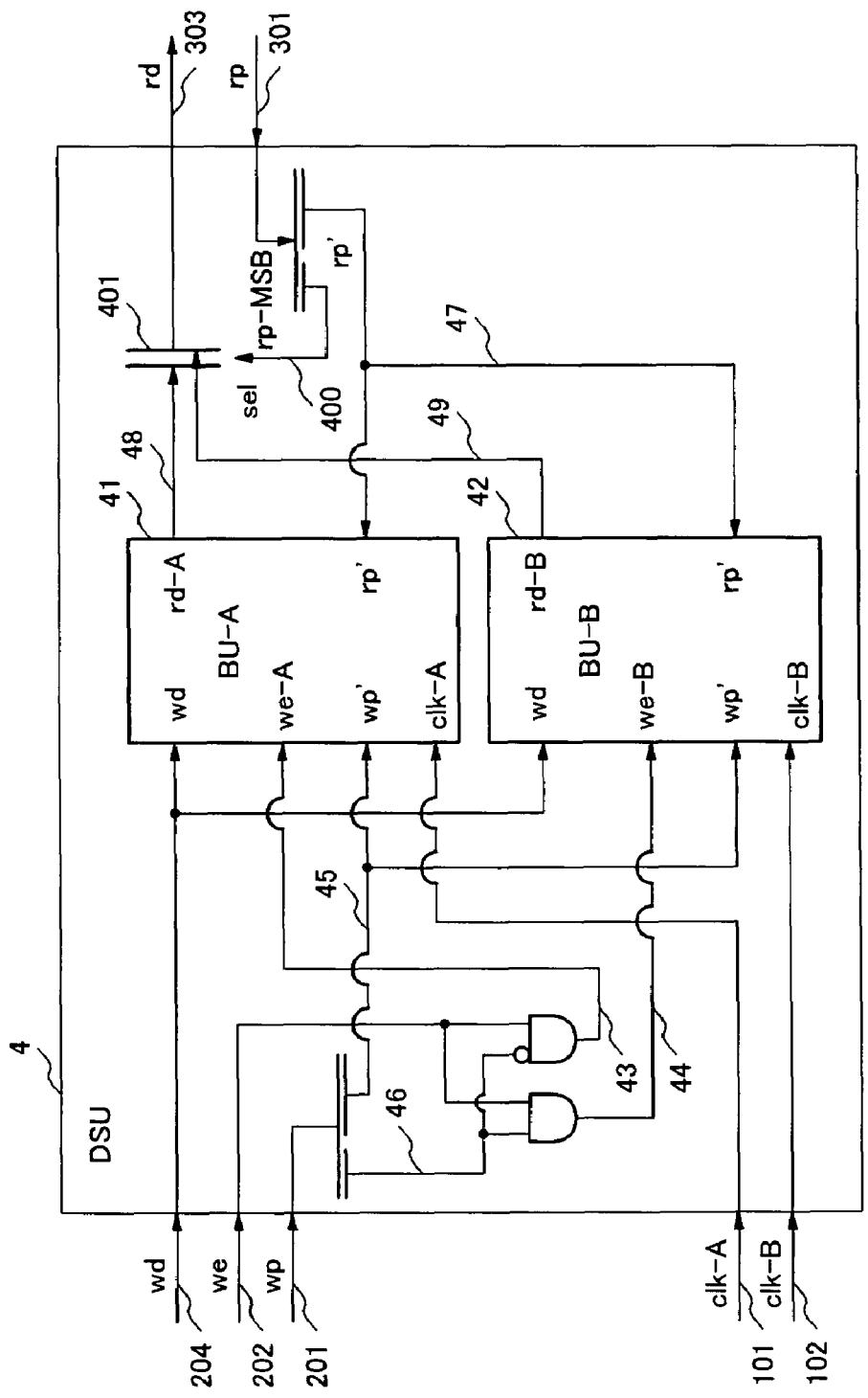
FIG. 4 is a block diagram showing a structural example of a data storage unit in the first exemplary embodiment of the present invention.

Next, the DSU 4 will be described in detail with reference to FIG. 4. The buffer of the DSU 4 has the two buffer units (BU-A 41 and BU-B 42). The DSU 4 generates a write enable signal (we-A) 43 to the BU-A 41 and a write enable signal (we-B) 44 to the BU-B 42 based on the we 202, the MSB of the wp 201, and a write pointer (wp-MSB) 46 thereof.

When the we-A 43 is 1, the wd 204 is written into BU-A 41 at an address indicated by a write pointer (wp') 45 at a timing determined by the clk-A 101. When the we-B 44 is 1, the wd 204 is written into BU-B 42 at an address indicated by the wp' 45 at a timing determined by the clk-B 102. The wp' 45 is a write pointer composed by the bits of the wp 201 the MSB thereof. That is, when the wp 201 is an n-bit pointer, the lower-order (n-1) bits of the wp 201 correspond to the wp' 45.

In the DSU 4, data is read from the BU-A 41 at an address indicated by a read pointer (rp') 47 and outputted as read data (rd-A) 48. Data is read from the BU-B 42 at an address indicated by the rp' 47 and outputted as read data (rd-B) 49. The rp' 47 is a read pointer composed by the bits of the rp 301 other than the rp-MSB 400 which is the MSB of the rp 301. That is, when the rp 301 has an n-bits, lower-order (n-1) bits of the rp 301 correspond to the rp' 47. When the rp-MSB 400 is 0, the rd-A 48 is selected by a selector 401. When the rp-MSB 400 is 1, the rd-B 49 is selected by the selector 401. The selected read data, rd-A 48 or the rd-B 49, is outputted as the rd 303.

Figure 5:
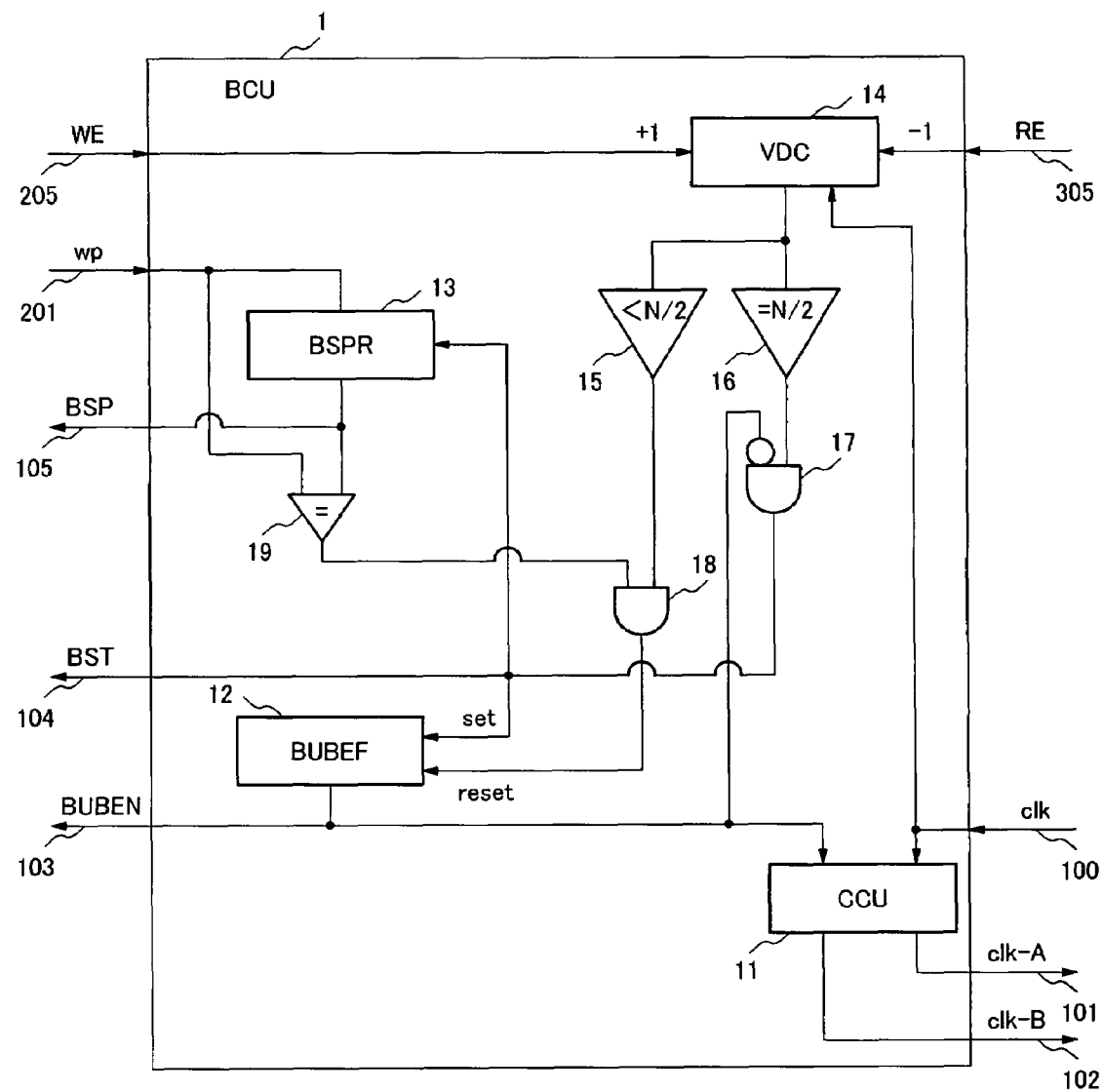
FIG. 5 is a block diagram showing a structural example of a buffer control unit in the first exemplary embodiment of the present invention.

Next, the BCU 1 will be described in detail with reference to FIG. 5. The VDC 14 is an updown counter for counting the clk 100. When the WE 205 is 1, the VDC 14 counts up. When the RE 305 is 1, the VDC 14 counts down. When both the WE 205 and the RE 305 are the same logic level, 1 or 0, the VDC 14 doesn't count up nor count down.

The BUBEF 12 is a flag indicating that the BU-B 42 is enabled. Specifically, when it is determined by a comparator 16 that a value of the VDC 14 is equal to N/2 (N is maximum buffer capacity), the BUBEF 12 is set to 1 by an AND gate (AND) 17. In contrast, when a match between a value of the wp 201 and a pointer value held by the BSPR 13 is determined by a comparator 19 and it is determined by a comparator 15 that the value of the VDC 14 is smaller than N/2, the BUBEF 12 is reset to 0 by an AND gate (AND) 18. A state of the BUBEF 12 is outputted as the buffer unit-B enable signal (BUBEN) 103. As described above, the state in which the BUBEN 103 is 1 indicates that valid data of N/2 words is stored in the DSU 4 and thus the BU-A 41 is full. Therefore, when the BUBEN 103 is 1, subsequent valid data is written into the BU-B 42. When the BUBEN 103 is 0, the BU-B 42 has no valid data.

In this embodiment, in order to use the BU-A 41 as a FIFO unit, ring buffer control is performed using the wp 201. Therefore, a value of the wp 201 at a timing when valid data are stored in the entire area of the BU-A 41, that is, at a timing when the BUBEN 103 is changed from 0 to 1 is not uniquely determined. Thus, for use in a case where the wp 201 and the rp 301 are to be generated, the BSPR 13 holds, as the value of the buffer unit-B switch pointer (BSP) 105, a value of the wp 201 at a timing when the BUBEN 103 is changed from 0 to 1 (BUBEN set timing signal (BST) 104), that is, at a timing when an output of the AND 17 becomes 1.

The CCU 11 supplies the clk-A 101 and the clk-B 102 to the BU-A 41 and the BU-B 42, respectively, based on a value of the BUBEF 12.

Figure 6:
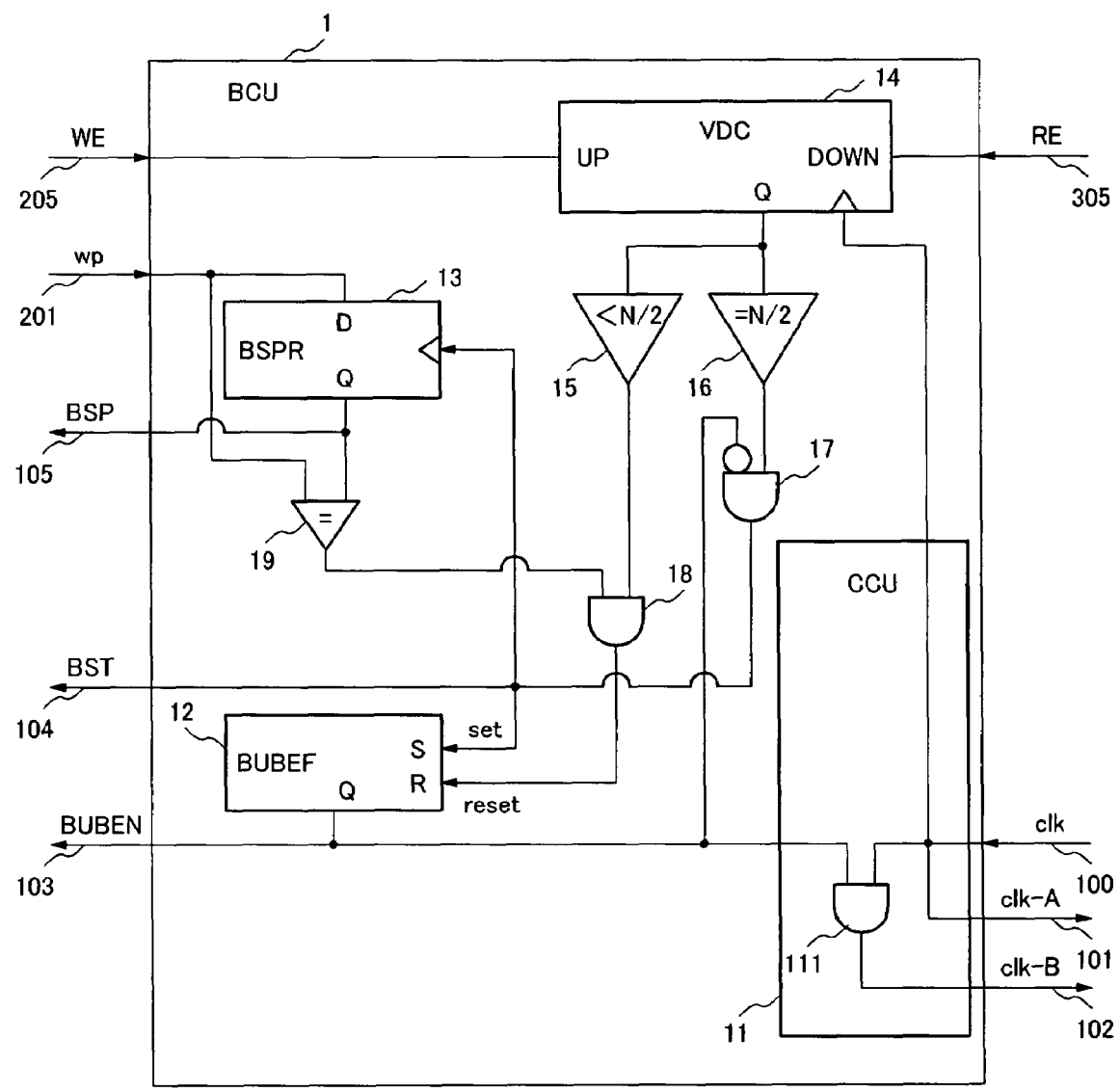
FIG. 6 is a block diagram showing a detailed structural example of the buffer control unit in the first exemplary embodiment of the present invention.

The BCU 1 will be described in more detail with reference to FIG. 6. The VDC 14 is the updown counter for counting the clk 100. When the WE 205 is 1, the VDC 14 counts up. When the RE 305 is 1, the VDC 14 counts down.

The BUBEF 12 is a reset-set flip-flop (RS-FF). When the output of the AND 17 is 1, that is, when the BUBEN 103 is 0 and the value of the VDC 14 is equal to N/2, the BUBEF 12 is set. When an output of the AND 18 is 1, that is, when the value of the wp 201 is equal to the value of the buffer unit-B switch pointer (BSP) 105 and the value of the VDC 14 is smaller than N/2, the BUBEF 12 is reset.

The BSPR 13 is a D type flip-flop (D-FF) and holds the value of the wp 201 at a timing when the output of the AND 17 becomes 1, that is, at a timing when the BUBEN 103 is changed from 0 to 1.

Only when the BUBEN 103 is 1, the CCU 11 outputs the clk 100 as the clk-B 102 through an AND gate (AND) 111. The CCU 11 constantly outputs the clk 100 as the clk-A 101 as it is.

Figure 8:
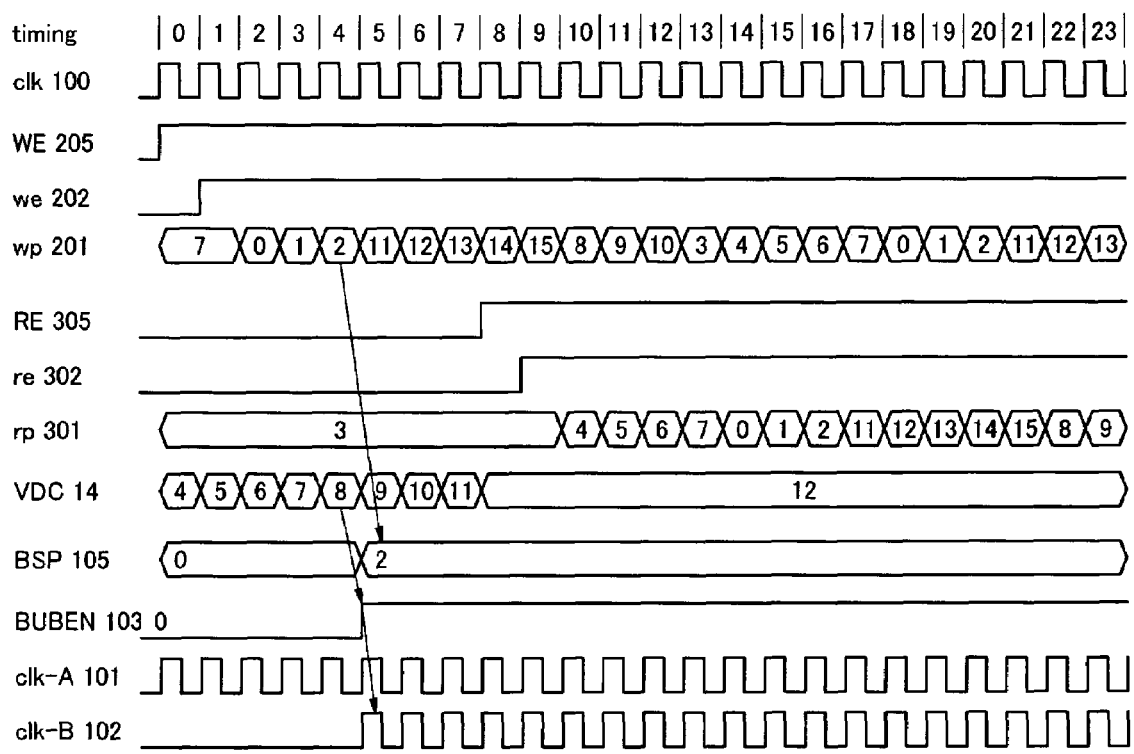
FIG. 8 is a timing diagram showing an operation of the buffer circuit according to the first exemplary embodiment of the present invention in a state in which the value of the valid data amount counter increases.
Figure 9:
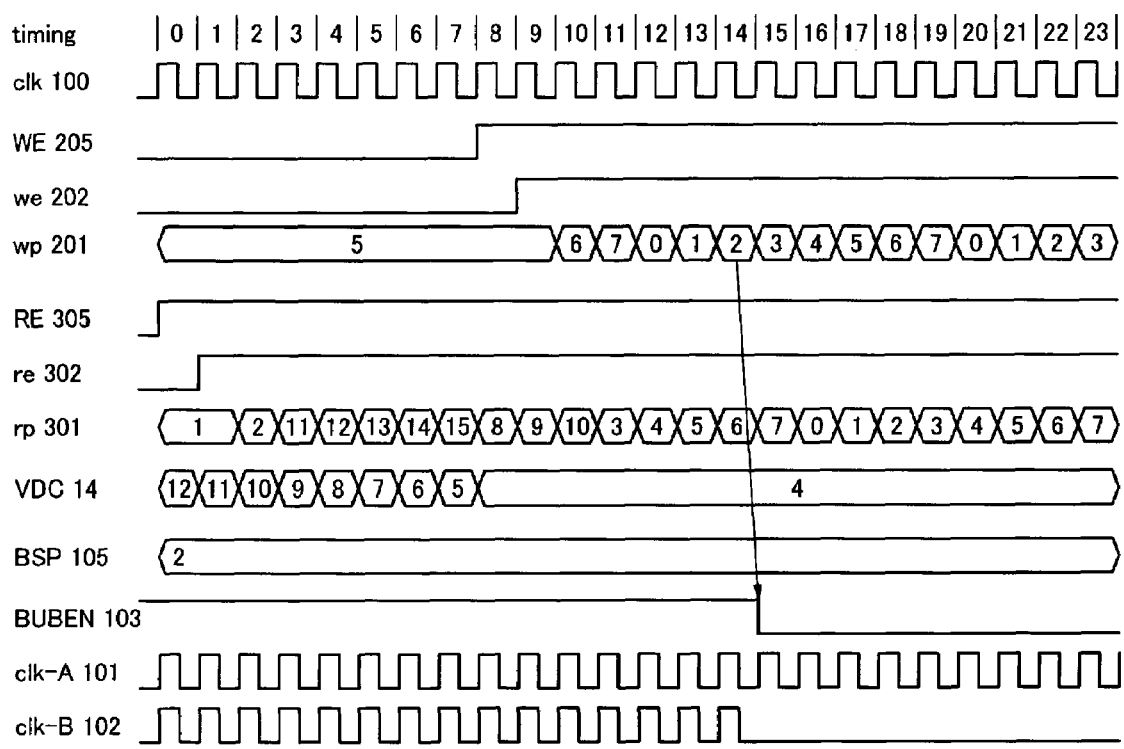
FIG. 9 is a timing diagram showing an operation of the buffer circuit according to the first exemplary embodiment of the present invention in a state in which the increased value of the valid data amount counter decreases.

Hereinafter, the operation of the FIFO buffer circuit having the above-mentioned structure will be described with reference to time charts shown in FIGS. 7 to 9. In order to facilitate understanding, a case where the maximum buffer capacity N is set to 16 words will be described as an example. In other words, when the BU-B 42 is used, the FIFO buffer circuit according to this embodiment becomes 16-word FIFO buffer circuit. On the other hand, when the BU-B 42 is not used, the FIFO buffer circuit becomes 8-word FIFO buffer circuit. The maximum FIFO buffer size is 16 words, so each of the wp 201 and the rp 301 is a 4-bit pointer.

The operation of the FIFO buffer circuit in a state in which the value of the VDC 14 is equal to or smaller than N/2 (=8) will be described with reference to FIG. 7. Assume that an initial value of each of the WPR 24, RPR 34, and the BSPR 13 is 0. Therefore, an initial value of each of the wp 201 and the rp 301 is 0.

Figure 7:
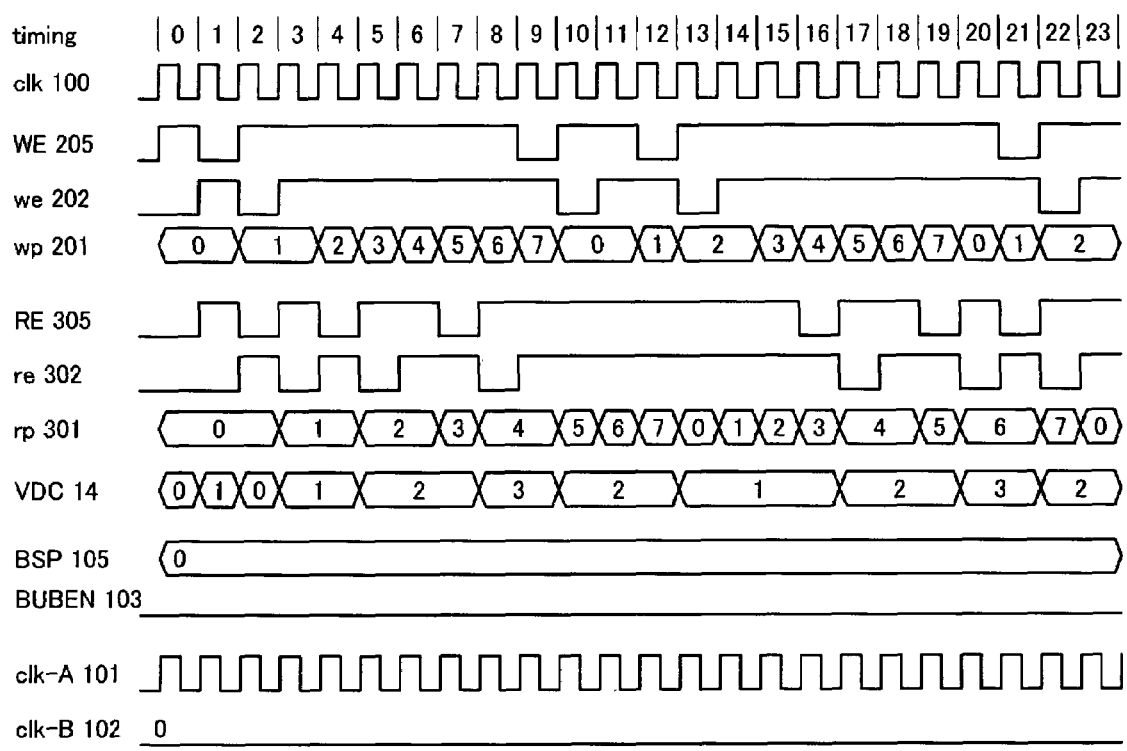
FIG. 7 is a timing diagram showing an operation of the buffer circuit according to the first exemplary embodiment of the present invention in a state in which a value of a valid data amount counter is small.

As shown in FIG. 7, when the WE 205 becomes 1 at a timing 0 (t0), the we 202 changes to 1 at a timing 1 (t1). At this time, the wp 201 is 0, so the wd 204 is written into the BU-A 41. The wp 201 is incremented by one at a timing 2 (t2).

When the RE 305 becomes 1 at t1, the re 302 changes to 1 at t2. At this time, the rp 301 is 1, so the read data (rd-A) 47 is read from the BU-A 41. The rp 301 is incremented by one at a timing 3 (t3).

The WE 205 becomes 1 at t0, so the VDC 14 is incremented by one at t1 to change to 1. The RE 305 becomes 1 at t1, so the VDC 14 is decremented by one at t2 to change to 0.

After that, when the WE 205 is 1, the wd 204 is written. When the RE 305 is 1, the written data is read as the read data (rd-A) 47. At this time, the data is read immediately after the data is written, so the value of the VDC 14 which indicates a difference between the number of written data and the number of read data does not reach N/2 (=8). Therefore, an output of the comparator 16 remains 0, so the BUBEN 103 is not set to 1. Thus, the clk-B 102 is in a disable state, with the result that the BU-B 42 does not operate. The buffer unit-B switch pointer (BSP) 105 continues to have an initial value of 0 and does not change.

Next, the operation of the FIFO buffer circuit in a state in which the value of the VDC 14 increases to exceed N/2 (=8) will be described with reference to FIG. 8. As shown in FIG. 8, assume that valid data left in the BU-A 41 is 4 words at t0 and thus the value of the VDC 14 is 4. When subsequent writing continues, the value of the VDC 14 becomes 8 at a timing 4 (t4) When the value of the VDC 14 is a half of 16 (N/2=8; N is the maximum capacity), the output of the comparator 16 becomes 1 at a timing 5 (t5), so the BST 104 becomes 1. Then, the BUBEF 12 is set, so the BUBEN 103 becomes 1. Therefore, the clk-B 102 starts to be supplied to the BU-B 42.

When the BST 104 is 1, the output of the OR 29 in the WPG 21 of the WCU 2 is 1, so the selector 200 selects the inverted output 26 of the wp-MSB 206. Then, the MSB of the WPR 24 is set, with the result that the MSB of the wp 201, that is, the wp-MSB 206 becomes 1. At t5, a value other than the MSB of the wp 201, that is, a value of lower-order three bits is incremented by one and thus becomes 3, so the entire value of the wp 201 exhibits 11 (=3+8). After t5, the BU-B 42 becomes enabled.

The value of the wp 201 at t4, that is, 2 is held to the buffer unit-B switch pointer (BSP) 105 at t5.

After the BU-B 42 is enabled, when the value of the wp 201 becomes 10 (1010B) at a timing 12 (t12), the lower-order three bits of the wp 201 become equal to the lower-order three bits (010B) of the buffer unit-B switch pointer (BSP) 105, so the output of the comparator 27 is 1. At this time, the BUBEN 103 is 1, so the output of the AND 28 is 1. At a timing 13 (t13), the inverted output 26 of the wp-MSB 206 is selected to change the wp-MSB 206 to 0. Therefore, the value of the wp 201 which is incremented by one exhibits 3 in the entire four bits.

On the other hand, when the value of the rp 301 becomes 2 at a timing (t16), the lower-order three bits of the rp 301 becomes equal to the lower-order three bits of the buffer unit-B switch pointer (BSP) 105, so the output of the comparator 37 is 1. At this time, the BUBEN 103 is 1, so the output of the AND 38 is 1. At a timing 17 (t17), the inverted output 36 of the rp-MSB 306 is selected to change the rp-MSB 306 to 1. Therefore, the value of the rp 301 which is incremented by one exhibits 11 (=3+8) in the entire four bits.

Therefore, when the value of the VDC 14 reaches N/2 (=8), the BUBEN 103 becomes 1, so the clk-B 102 starts to be supplied to the BU-B 42 and thus the BU-B 42 is changed from a disable state to an enable state. After that, each of the BU-A 41 and the BU-B 42 in the DSU 4 becomes writable and readable.

Subsequently, the operation of the FIFO buffer circuit in a state in which the value of the VDC 14 decreases from a value equal to or larger than N/2 to a value smaller than N/2 will be described with reference to FIG. 9. As shown in FIG. 9, assume that the value of the VDC 14 is 12 at t0. At this time, subsequent reading continues, the value of the VDC 14 decreases to the value smaller than N/2 (=8) at t5.

Then, when the value of the wp 201 becomes 2 at t14, the lower-order three bits (010B) of the buffer unit-B switch pointer (BSP) 105 become equal to the lower-order three bits of the wp 201. On the other hand, the value of the VDC 14 is 4 smaller than N/2, so the output of the comparator 15 is 1. Therefore, the BUBEF 12 is reset to 0 at t15 to change the BUBEN 103 to 0, so the clk-B 102 stops to be supplied to the BU-B 42. Because the BUBEN 103 is 0, the output of the AND 28 is 0. At this time, the BST 104 is 0, so the output of the OR 29 is 0. Therefore, the wp-MSB 206 is selected by the selector 200. After that, the wp-MSB 206 remains 0, with the result that only the lower-order three bits of the wp 201 are incremented by one.

As described above, in the FIFO buffer circuit according to the first exemplary embodiment, writing and reading is controlled based on the valid data amount, so the buffer capacity can be dynamically adjusted. At this time, the operation of the buffer unit which is not used can be stopped, with the result that the power consumption can be efficiently reduced.

2. Second Exemplary Embodiment

In the first exemplary embodiment, the case where the BU-B 42 is enabled simultaneously with the start of supply of the clk-B 102 is described. The supply of the clk-B 102 may be started before the BU-B 42 is enabled. In other words, the BU-B 42 may be used after the supply of the clock is started to stabilize the BU-B 42 in advance. Hereinafter, such a mechanism will be described with reference to FIGS. 10 and 11.

Figure 10:
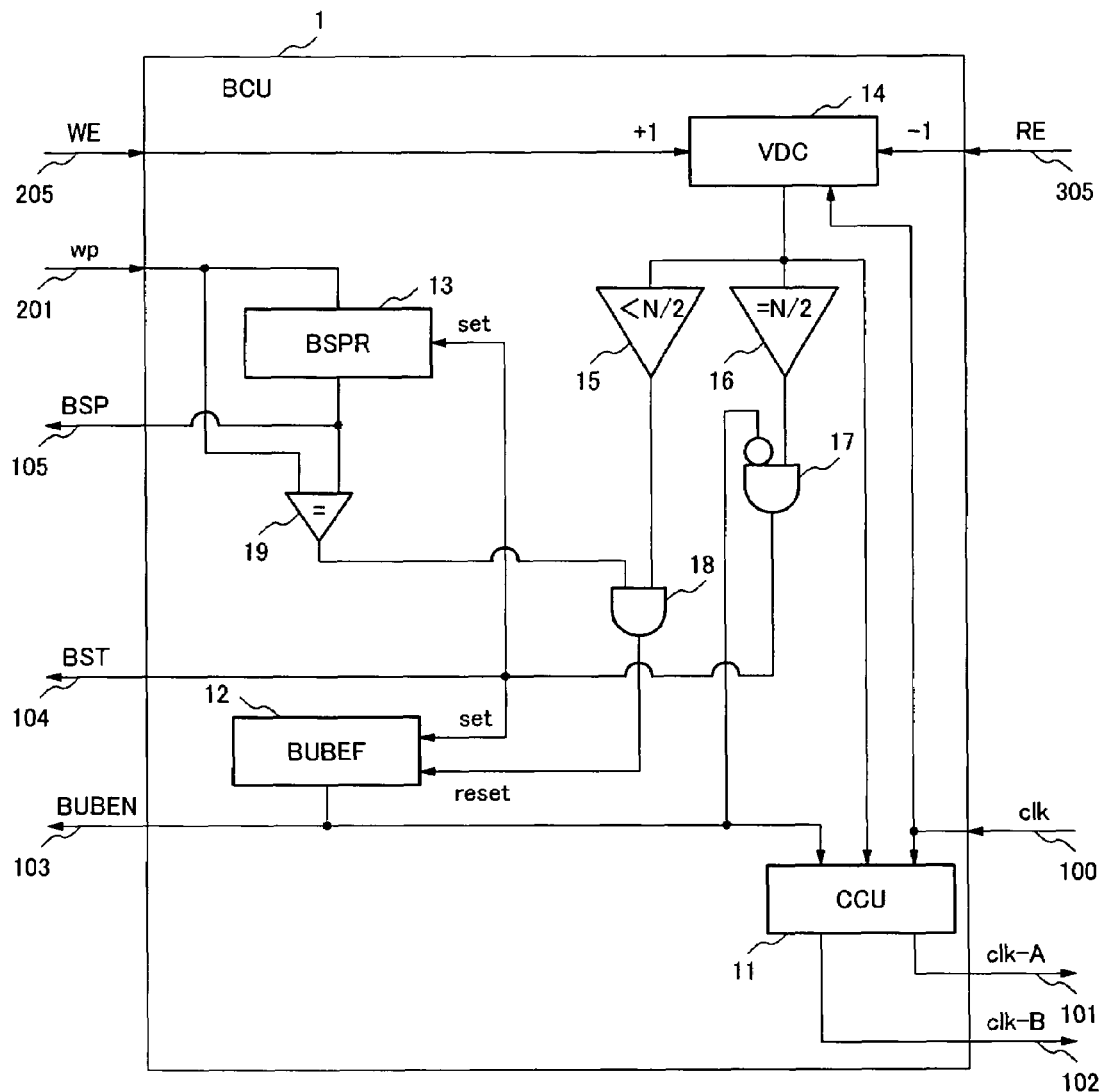
FIG. 10 is a block diagram showing a structural example of a buffer control unit in a second exemplary embodiment of the present invention.
Figure 11:
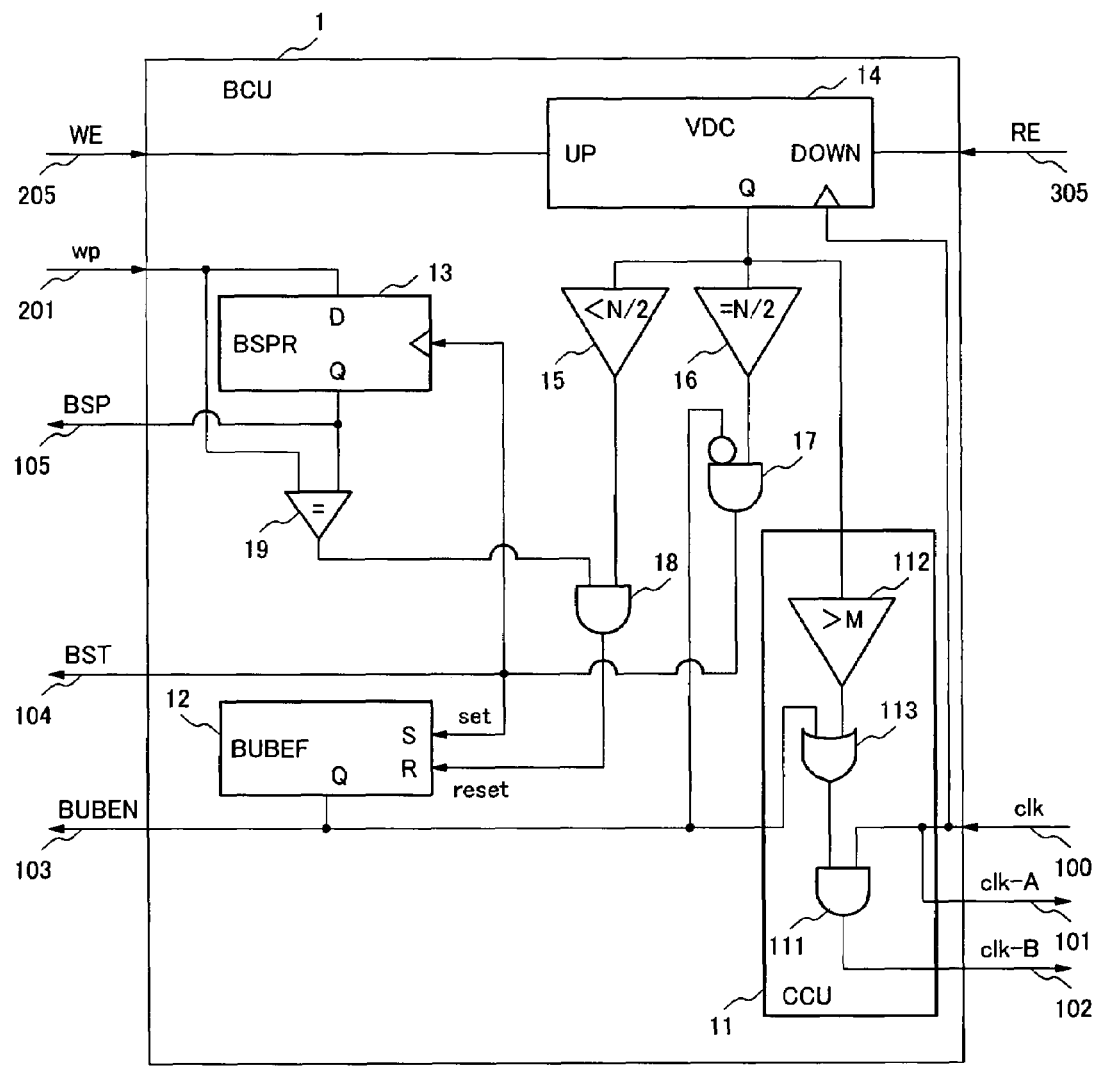
FIG. 11 is a block diagram showing a detailed structural example of the buffer control unit in the second exemplary embodiment of the present invention.

As shown in FIG. 10, in the BCU 1, the value of the VDC 14 is used for not only the comparators 15 and 16 but also the CCU 11. That is, as shown in FIG. 11, the CCU 11 includes a comparator 112 and an OR gate (OR) 113 in addition to the AND 111. The comparator 112 compares the value of the VDC 14 with a constant M and outputs 1 to the OR 113 when the value of the VDC 14 is larger than the constant M. The OR 113 outputs a logical OR of the output of the comparator 112 and the value of the BUBEN 103 to the AND 111. Therefore, not only in a case where the value of the BUBEN 103 is 1 but also in a case where the value of the VDC 14 is larger than the constant M, the CCU 11 generates the clk-B 102 from the clk 100 through the AND 111.

The operation of a FIFO buffer circuit using the BCU 1 having the above-mentioned structure will be described with reference to a time chart shown in FIG. 12. A case where the constant M is 5 will be described as an example. Assume that the maximum buffer capacity N is 16.

Figure 12:
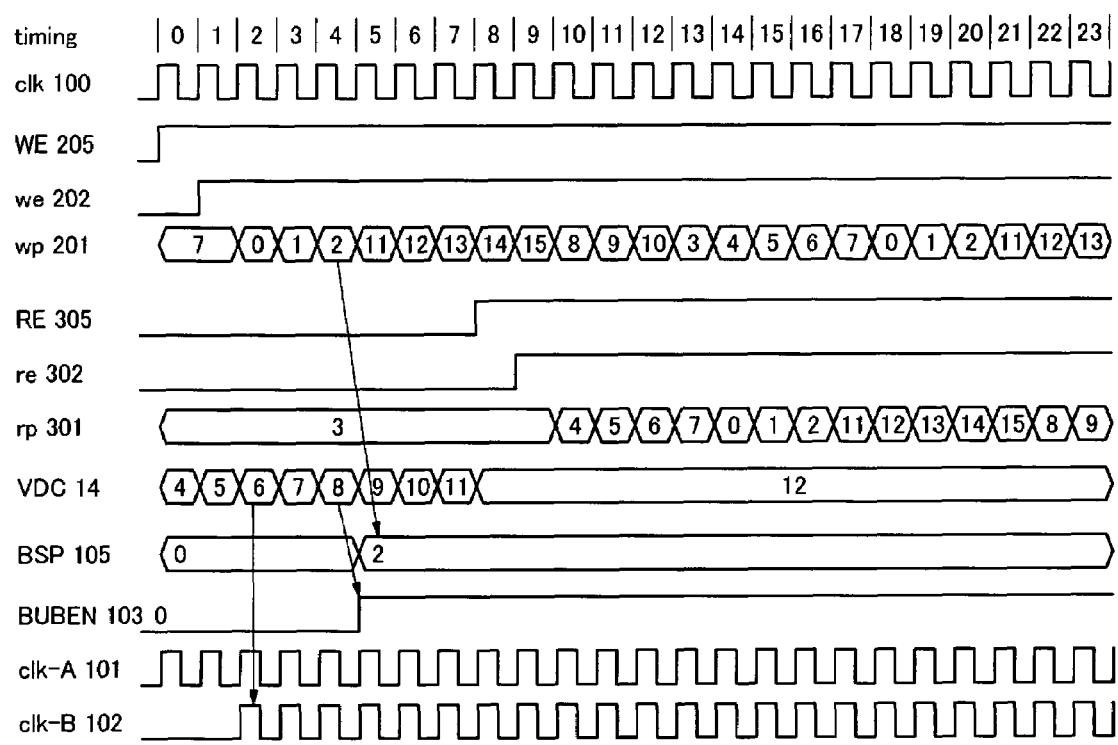
FIG. 12 is a timing diagram showing an operation of a FIFO buffer circuit using the buffer control unit in the second exemplary embodiment of the present invention.
Figure 13:
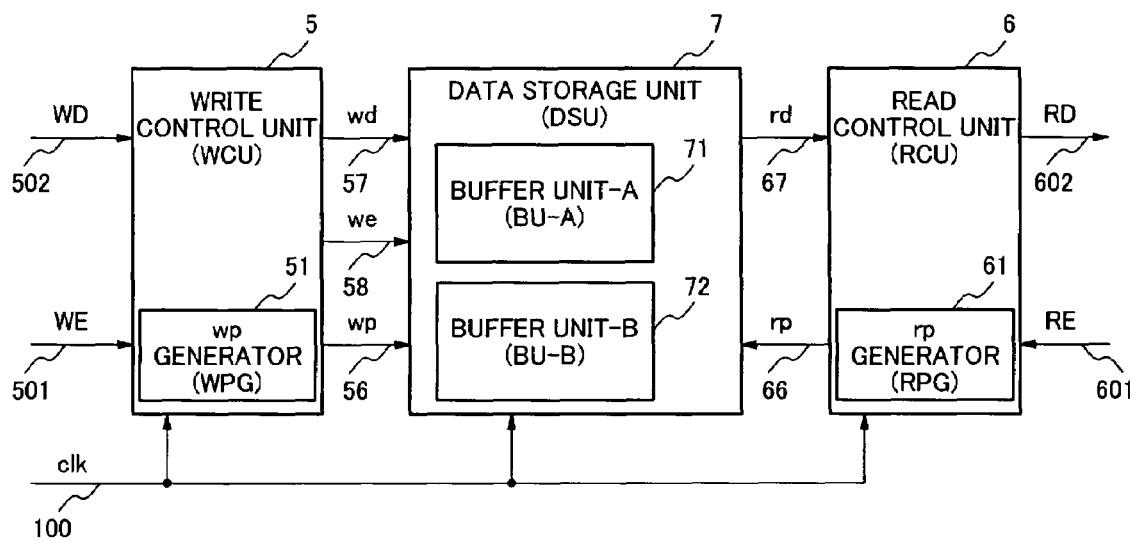
FIG. 13 is a block diagram showing a structural example of a conventional FIFO buffer circuit.
Figure 14:
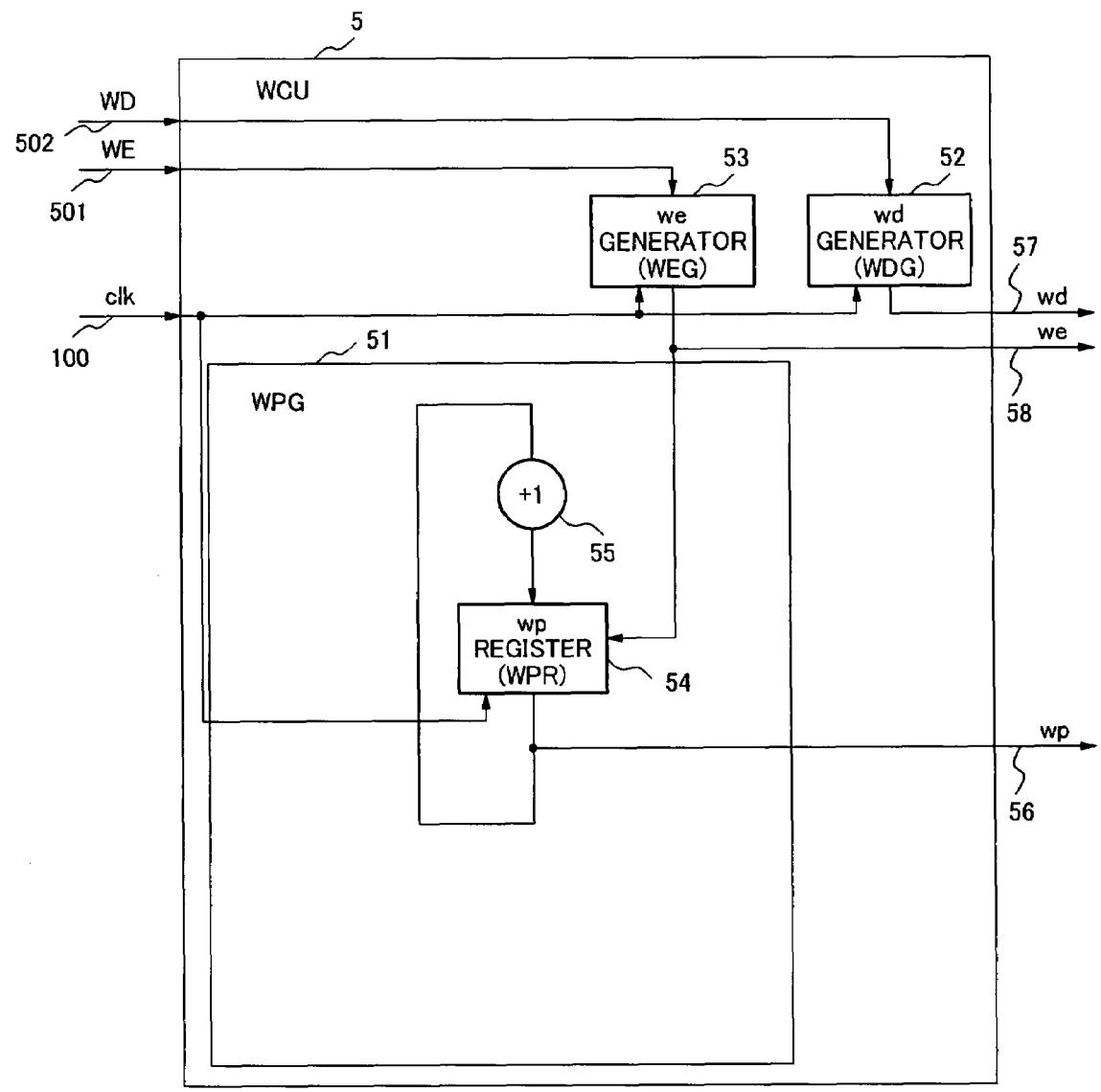
FIG. 14 is a block diagram showing a structural example of a write control unit in the conventional FIFO buffer circuit.
Figure 15:
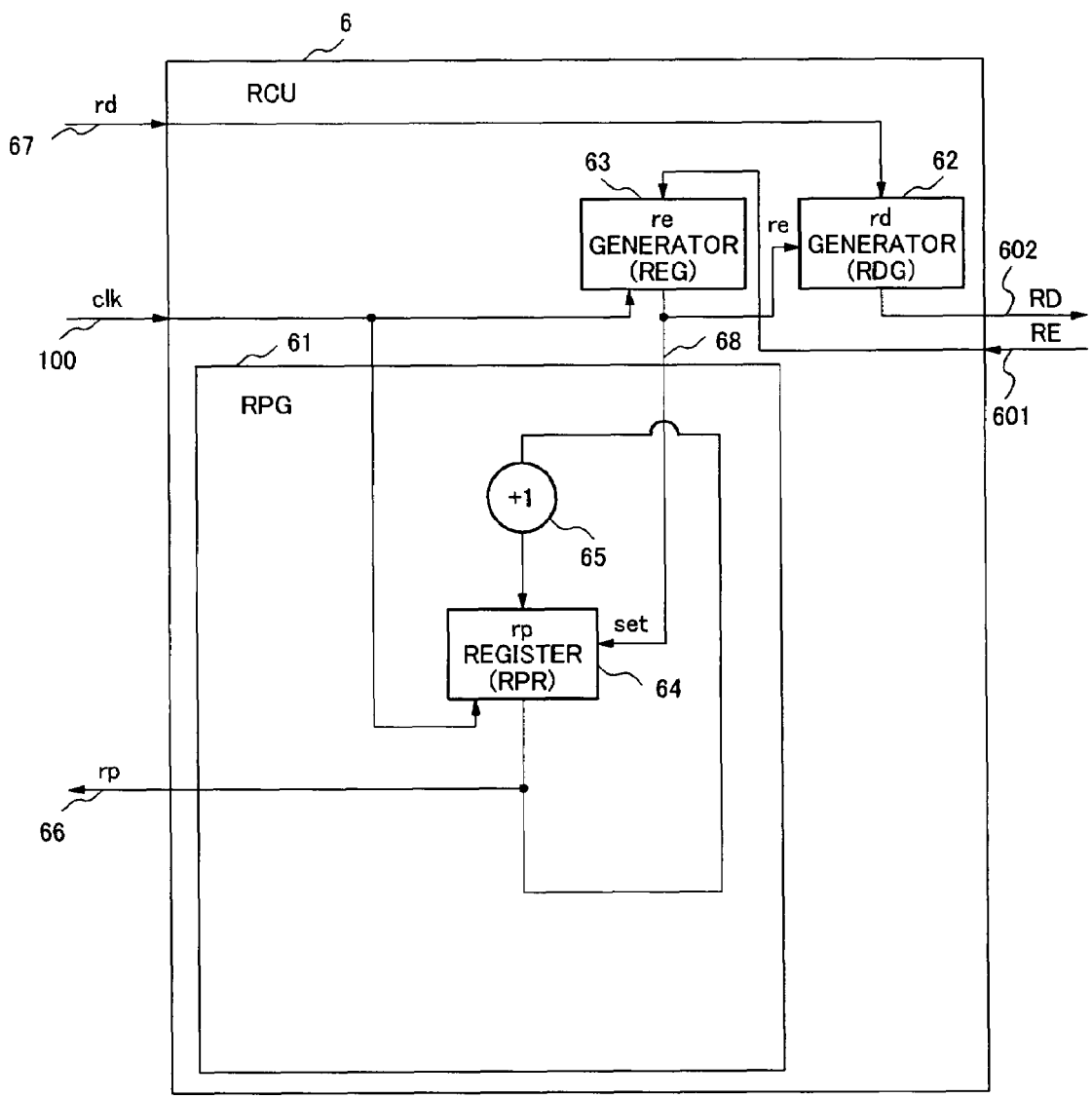
FIG. 15 is a block diagram showing a structural example of a read control unit in the conventional FIFO buffer circuit.
Figure 16:
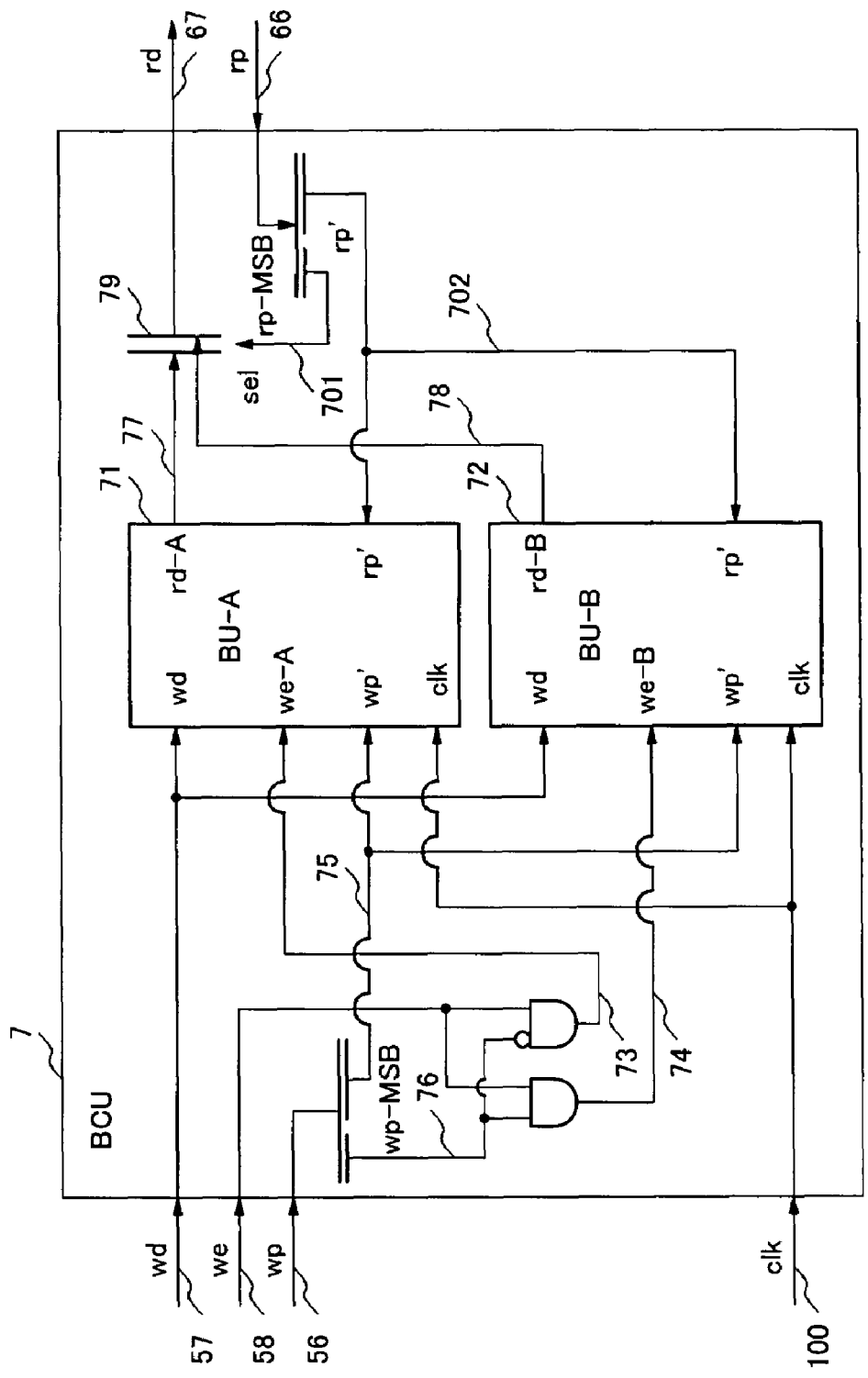
FIG. 16 is a block diagram showing a structural example of a data storage unit in the conventional FIFO buffer circuit.
Figure 17:
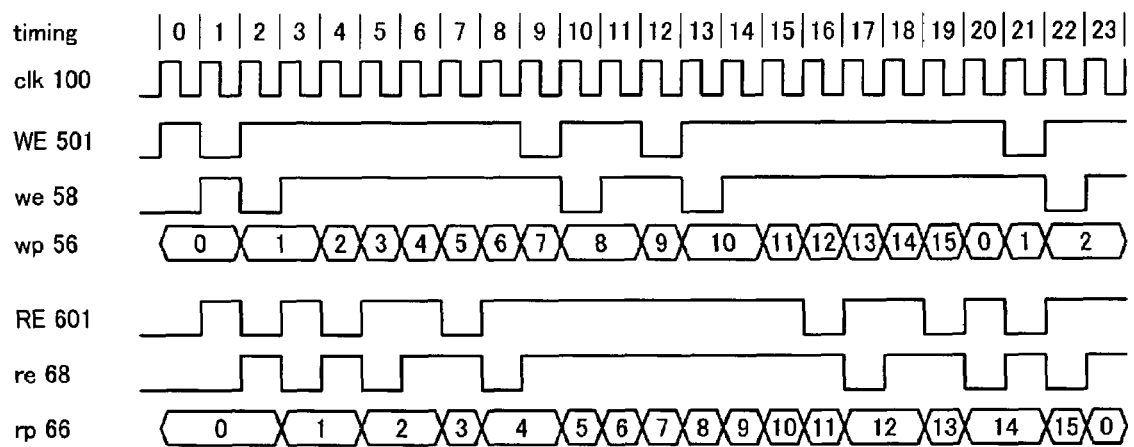
FIG. 17 a timing diagram showing an operation of a conventional FIFO buffer circuit.

As shown in FIG. 12, when the value of the VDC 14 becomes 6 at t2 and thus is larger than the constant M, the clk-B 102 starts to be supplied to the BU-B 42. When subsequent writing continues, the value of the VDC 14 becomes 8 at t4. Therefore, when the value of the VDC 14 is N/2, the BUBEN 103 becomes 1 at t5.

The value of the wp 201 at t4, that is, 2 is held as the buffer unit-B switch pointer (BSP) 105 by the BSPR 13 at t5. Simultaneously, the MSB of the wp 201, that is, the wp-MSB 206 changes to 1, so the value of the wp 201 which is incremented by one at t5 exhibits 11 in the entire four bits. After that, the BU-B 42 is enabled.

Therefore, when the supply of the clk-B 102 is started before the BU-B 42 is enabled, the stabilized BU-B 42 can be used. A time for stopping the BU-B 42 lengthens as the constant M increases, so an effect of reducing power consumption is high. In addition, when the constant M decreases, a margin between the time of supply of the clk-B 102 to the BU-B 42 and the time when the operation of the BU-B 42 is stabilized becomes larger. In view of those, it is only necessary to suitably set the value of the constant M to a value which is equal to or larger than 1 and smaller than N/2.

As described above, in the FIFO buffer circuit according to the second exemplary embodiment, the operation of one of the two buffer units which is not used is stopped, so the power consumption can be reduced. When the stop state is shifted to the operation state, the supply of the clock can be started early by a predetermined time. Therefore, there is an effect that the operation can be started with a stable state.

3. Third Exemplary Embodiment

In each of the first exemplary embodiment and the second exemplary embodiment, the case where the DSU 4 includes the two buffer units (BU-A 41 and BU-B 42) is described. The number of buffer units is an example and thus the present invention can be applied to a case where three or more buffer units are used.

For example, two buffer units (BU-Ax and BU-Ay), each of whose capacity is a half of that of the BU-A 41 can be used instead of the BU-A 41. The capacity of the BU-A 41 is a sum of the capacity of the buffer unit (BU-Ax) and the capacity of the buffer unit (BU-Ay).

A case where the buffer section is composed of the three buffer units (BU-Ax, BU-Ay, and BU-B) will be briefly described. In this case, when the value of the VDC 14 is smaller than N/4, only the buffer unit (BU-Ax) is used. When the value of the VDC 14 reaches N/4, the buffer unit (BU-Ay) is enabled for use. Then, when the value of the VDC 14 reaches N/2, the buffer unit (BU-B) is enabled for use. Therefore, even when the buffer section is composed of the three buffer units, the buffer capacity can be dynamically adjusted based on the valid data amount to suitably reduce power consumption.

As is apparent from the above description, when the buffer section is subdivided into more buffer units, the capacity corresponding to buffer units which can be set to the disable state increases.

As described above, according to the present invention, the buffer capacity can be dynamically adjusted based on the valid data amount. When the buffer section is subdivided into more buffer units, buffer units corresponding to a larger capacity can be set to the disable state. Therefore, the power consumption can be further reduced.

4. Fourth Exemplary Embodiment

The FIFO circuit according to each of the first exemplary embodiment, the second exemplary embodiment and the third exemplary embodiment has a FIFO function as viewed from an outside, which is identical to that of a normal FIFO circuit. Therefore, the FIFO circuit can be used for each electronic device having the FIFO function.

For example, in the case of a communication device, the FIFO circuit can be used for flow control between a signal receiving unit and a signal processing unit.

Alternately, in the case of an information processing device such as a computer, the FIFO circuit can be operated as a queue.

When the FIFO circuit according to the present invention is used for an electronic device, the capacity of the used FIFO circuit can be adjusted based on the number of valid data. The operation of the part of the FIFO circuit which is out of use can be stopped. Therefore, there is an effect that the power consumption of the FIFO section can be minimized.

While this invention has been described in connection with certain exemplary embodiments, it is to be understood that the subject matter encompassed by way of this invention is not to be limited to those specific embodiments. On the contrary, it is intended for the subject matter of the invention to include all alternatives, modifications and equivalents as can be included within the spirit and scope of the following claims.

Further, it is the inventor's intent to retain all equivalents of the claimed invention even if the claims are amended during prosecution.

This application is based on Japanese Patent Application No. 2006-097595 filed on Mar. 31, 2006, and including specification, claims, drawings and summary. The disclosure of the above Japanese Patent Application is incorporated herein by reference in its entirety.

What is claimed is:

1. A buffer circuit, comprising:
a storage unit having a first storage capacity that stores data based on a write request inputted from an outside, and outputs the data in an order in which the data was written, based on a read request inputted from the outside, and
a valid data counting unit counting a word count of valid data based on a number of input of the write request and a number of input of the read request,
wherein a second storage capacity in the first storage capacity which is used to store the data is adjusted based on an amount of valid data which has been written into the storage unit but has not been read therefrom,
wherein the storage unit comprises a plurality of buffer units whose total storage capacity comprises the first storage capacity,
wherein the second storage capacity is determined by a number of used buffer units of the plurality of buffer units which number is changed corresponding to the amount of valid data, and
wherein the number of used buffer units is determined based on the word count.

2. A buffer circuit according to claim 1,
wherein the number of used buffer units is determined based on a result obtained by comparison between the word count and a first value.

3. A buffer circuit according to claim 2, wherein
when the word count is equal to the first value, the number of used buffer units increases and
when the word count is smaller than the first value, the number of used buffer unit decreases.

4. A buffer circuit according to claim 1, wherein
an operation of a buffer unit other than the used buffer units of the plurality of buffer units is stopped.

5. A buffer circuit according to claim 1, wherein
supply of a clock to a buffer unit other than the used buffer units of the plurality of buffer units is stopped.

6. A buffer circuit according to claim 1, further comprising:
a write pointer generating unit generating a write pointer which indicates a destination address of the data to be written into the storage unit and which is incremented after the data is written;
a read pointer generating unit generating a read pointer which indicates a source address of the data to be read from the storage unit and which is incremented after the data is read,
wherein the number of a first buffer unit of the plurality of buffer units into which first buffer unit the data is written is determined based on the word count,
wherein the write pointer comprises a write buffer specifying portion for specifying the first buffer unit into which the data is written, and
wherein the read pointer comprises a read buffer specifying portion for specifying a second buffer unit of the plurality of buffer units from which second buffer unit the data is read.

7. A buffer circuit according to claim 6,
wherein the number of the first buffer unit is determined based on a result obtained by comparison between the word count and a first value.

8. A buffer circuit according to claim 7, wherein
when the word count is equal to the first value, the number of used buffer units increases and
when the word count is smaller than the first value, the number of used buffer unit decreases.

9. A buffer circuit according to claim 7, further comprising,
a buffer switch pointer holding unit for holding a value of the write pointer when the word count is equal to the first value,
wherein, when a value held by the buffer switch pointer is equal to a value of the write pointer, the value of the write buffer specifying portion is changed to the value specifying the buffer unit into which the valid data is written, and
wherein, when the value held by the buffer switch pointer is equal to a value of the read pointer, the value of the read buffer specifying portion is changed to a value specifying a buffer unit from which the valid data is read.

10. A buffer circuit according to claim 6, wherein
the plurality of buffer units comprise a first buffer unit which can be continuously operated and a second buffer unit which can be operated only when the valid data remains.

11. A buffer circuit according to claim 6, wherein
the plurality of buffer units comprise a first buffer unit to which a clock is continuously supplied and a second buffer unit to which a clock is supplied only when the valid data remains.

12. An electric device, comprising a buffer circuit according to claim 1.

13. A method of controlling a buffer circuit, comprising:
writing data into a storage unit having a first storage capacity, based on a write request from an outside;
reading the data from the storage unit in a an order in which the data was written, based on a read request from an outside;
adjusting a second storage capacity in the first storage capacity which is used to write the data, based on an amount of valid data which has been written into the buffer unit but has not been read therefrom; and
counting a word count of the valid data based on a number of input of the write request and a number of input of the read request,
wherein the storage unit comprises a plurality of buffer units whose total storage capacity comprises the first storage capacity,
wherein the second storage capacity is determined by a number of used buffer units of the plurality of buffer units which number is changed corresponding to an amount of valid data, and
wherein the number of used buffer units is determined based on the word count.

14. A method of controlling a buffer circuit according to claim 13,
wherein the number of used buffer units is determined based on a result obtained by comparison between the word count and a first value.

15. A method of controlling a buffer circuit according to claim 13, further comprising:

stopping an operation of a first buffer unit of the plurality of buffer units other than a second buffer unit of the plurality of buffer units in which the valid data remains; and
starting the operation of the first buffer unit when the second buffer unit is full with the valid data.

* * * * *